United States Patent [19]

DiRisio

[11] Patent Number: 5,047,900
[45] Date of Patent: Sep. 10, 1991

[54] ELECTRONIC FLASH APPARATUS

[75] Inventor: Anthony DiRisio, Rochester, N.Y.

[73] Assignee: Eastman Kodak Company, Rochester, N.Y.

[21] Appl. No.: 637,851

[22] Filed: Jan. 7, 1991

[51] Int. Cl.⁵ .............................................. G03B 15/02
[52] U.S. Cl. ...................................... 362/16; 362/306
[58] Field of Search ...................... 362/3, 16, 217, 223, 362/306, 382

[56] References Cited

U.S. PATENT DOCUMENTS

| 4,317,625 | 3/1982 | Van Allen | 362/16 |
| 4,356,538 | 10/1982 | Plumner | 362/3 |
| 4,412,276 | 10/1983 | Bliwow | 362/16 |
| 4,460,942 | 7/1984 | Pizzuti et al. | 362/16 |

Primary Examiner—Ira S. Lazarus
Assistant Examiner—Richard R. Cole
Attorney, Agent, or Firm—Roger A. Fields

[57] ABSTRACT

In an electronic flash assembly, an elastomeric strap secures a flash tube and a reflector housing relative to one another and is induced to yieldably bias the reflector housing firmly against a covering flash lens.

3 Claims, 2 Drawing Sheets

ELECTRONIC FLASH APPARATUS

BACKGROUND OF THE INVENTION

1. Field of the Invention

The invention relates generally to the field of photography, and in particular to electronic flash apparatus. More specifically, the invention relates to flash apparatus of the type wherein an elastomeric strap or belt is used to secure a flash tube and a reflector housing to one another.

2. Description of the Prior Art

The use of electronic flash apparatus primarily for photography is quite well known. Flash firing is produced by an instantaneous electronic discharge between two electrodes in a gas-filled glass tube. The flash tube is invariably mounted in a reflector housing to concentrate the light produced by the tube into a beam and redirect it toward a subject to be illuminated. The most efficient shape of the reflector housing is a parabola which concentrates the light into a beam that may have parallel, converging or diverging rays according to whether the tube is at the focal point of the parabola, in front of the focal point or behind it. Typically, the reflector housing is fitted with a transparent or translucent screen or lens positioned substantially perpendicular to the beam at an open front of the reflector housing. The flash lens acts as a diffuser, softening the light and spreading it more evenly over the subject.

To insure quality photographs when using an electronic flash unit, it will be appreciated that the light output values and the light distribution pattern must be consistently repeatable; otherwise, the strobe would not perform in the intended manner, and the quality of the photographs would of course suffer. Toward this end, the flash tube must be precisely located relative to the reflector housing and the flash lens. One approach for securing the flash tube, the reflector housing and the flash lens with respect to one another is disclosed in U.S. Pat. No. 4,460,942, issued July 17, 1984. This patent discloses an electronic flash assembly comprising a concave shaped reflector housing having an open front, a closed rear, and a pair of opposite side openings; a flash lens covering the open front of the reflector housing; a flash tube positioned in the reflector housing with respective end portions protruding outward from the side openings of the reflector housing to loosely support the flash tube; and an elastomeric strap having a pair of opposite end portions, an intermediate portion extending over the exterior of the reflector housing at its closed rear, and respective openings located between the end portions and intermediate portion of the strap which receive the end portions of the flash tube to allow the strap to secure the tube and the housing relative to one another. The strap is stretched taut about the end portions of the flash tube and over the reflector housing to yieldably bias the tube toward the closed rear of the housing. The flash lens is snap fitted to the reflector housing via respective detents of the housing that are received in engagement openings in the lens. The strap includes an integral raised portion in the vicinity of where it extends over the reflector housing, which is compressed between a back wall portion of the flash enclosure and the reflector housing to yieldably bias the housing toward a front wall portion of the flash enclosure.

SUMMARY OF THE INVENTION

According to the invention, an electronic flash assembly comprising (a) a concave shaped reflector housing having an open front, a closed rear, and a pair of opposite side openings, (b) a flash lens covering the open front of the reflector housing, (c) a flash tube positioned in the reflector housing with respective end portions protruding outward from the side openings of the reflector housing to loosely support the flash tube, and (d) an elastomeric strap having a pair of opposite end portions, an intermediate portion extending over the exterior of the reflector housing at its closed rear, and respective openings located between the end portions and intermediate portion of the strap which receive the end portions of the flash tube to allow the strap to secure the tube and the housing relative to one another, is characterized in that:

fixed means holds the flash lens and engages the elastomeric strap at its end portions for inducing the strap to yieldably bias the reflector housing firmly against the lens.

Since the elastomeric strap is engaged at its end portions to yieldably bias the reflector housing against the flash lens, in addition to the strap operating to secure the reflector housing and the flash tube relative to one another, a simpler less costly construction is achieved as compared to the electronic flash assembly disclosed in prior art U.S. Pat. No. 4,460,942. That is, there is no need as in the prior art patent to snap fit the flash lens to the reflector housing.

DETAILED DESCRIPTION OF THE PREFERRED EMBODIMENT

The invention is disclosed as being embodied preferably in an electronic flash assembly. Because the features of this type of flash unit are generally well known, the description which follows is directed in particular to elements forming part of or cooperating directly with the disclosed embodiment. It is to be understood, however, that other elements not specifically shown or described may take various forms known to persons of ordinary skill in the art.

Figure 1:
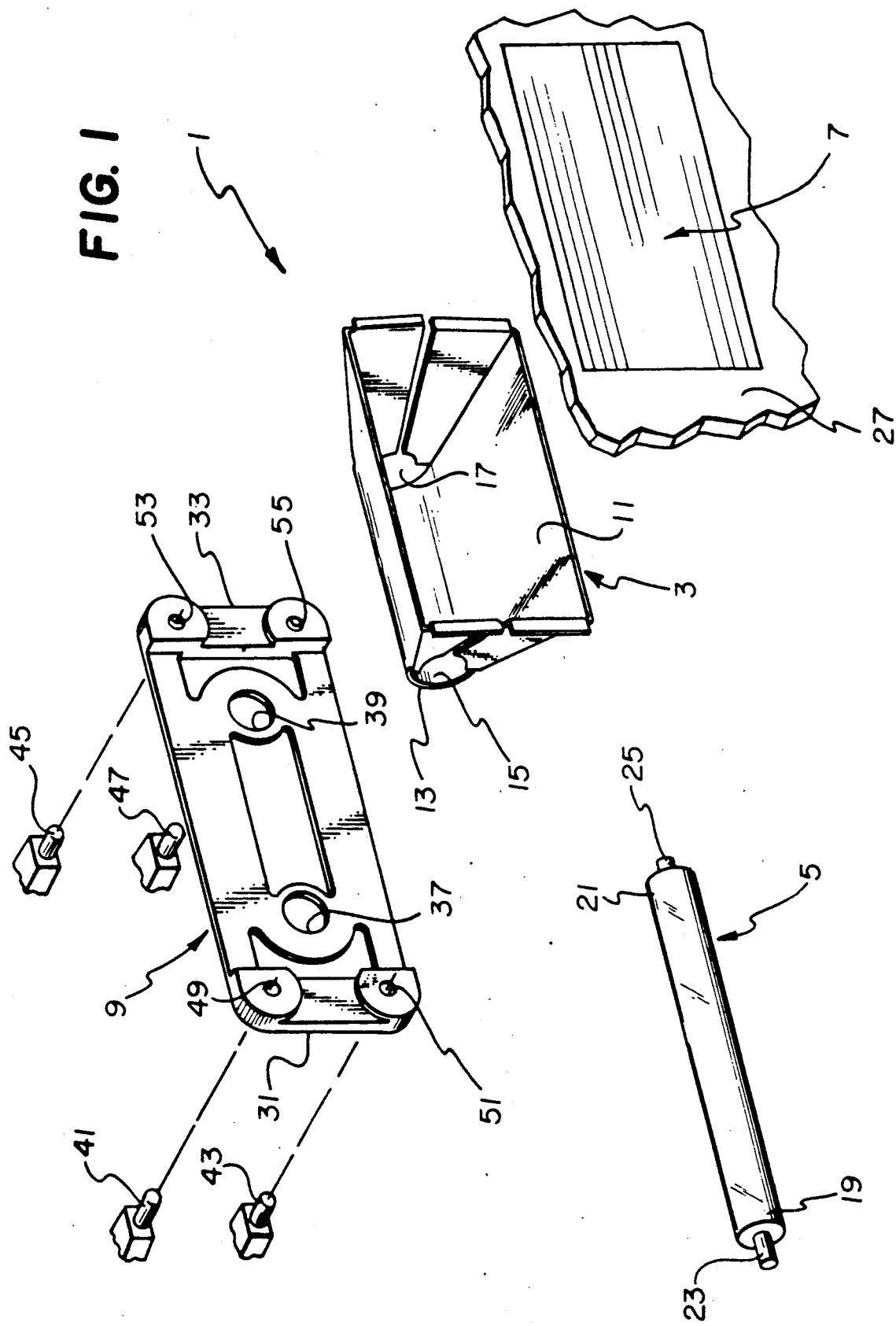
FIG. 1 is an exploded perspective view of an electronic flash assembly according to a preferred embodiment of the invention.
Figure 2:
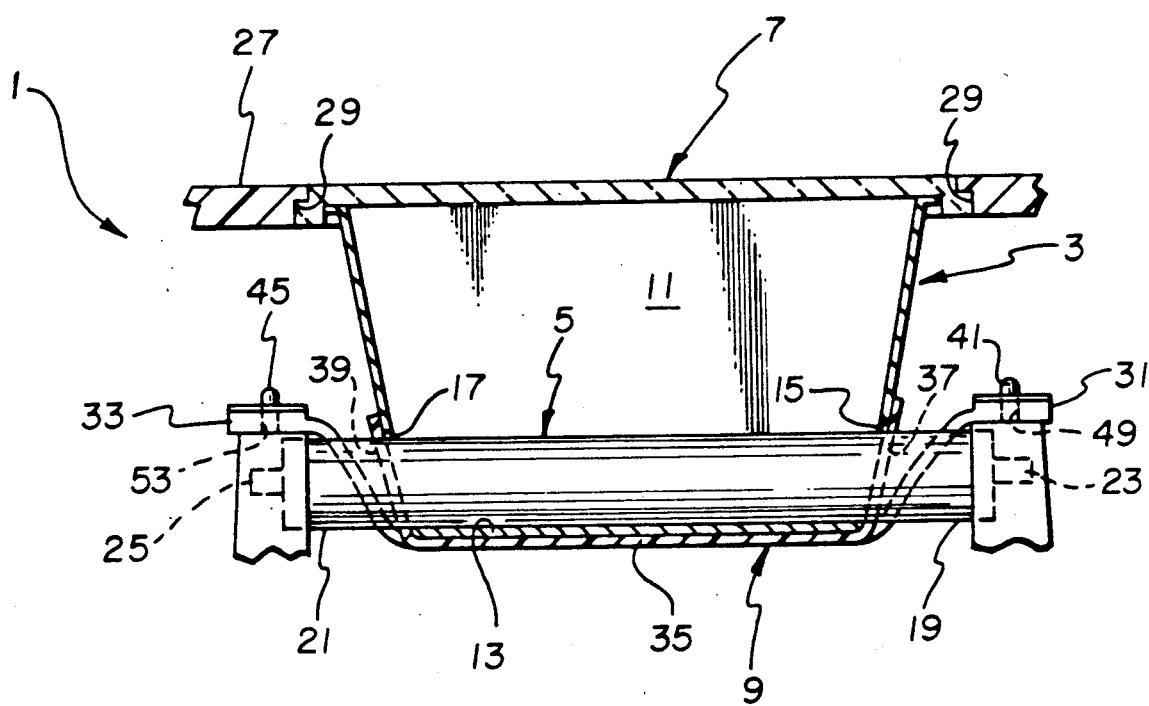
FIG. 2 is a cross-sectioned view of the electronic flash assembly.

Referring now to FIGS. 1 and 2 of the drawings, an electronic flash assembly 1 is shown which comprises a reflector housing 3, a flash tube 5 of the gas discharge type, a transparent flash lens 7, and an elastomeric belt 9.

The reflector housing 3 is concave shaped and has an open front 11, a closed rear 13, and pair of opposite side openings 15 and 17. The flash tube 5 is positioned in the reflector housing 3 as shown in FIG. 2 with respective opposite end portions 19 and 21 protruding outward from the side openings 15 and 17 of the reflector housing to loosely support the flash tube. Respective terminals 23 and 25 extend from the opposite end portions 19 and 21 of the flash tube 5 for connection to a source of electrical energy, preferably in the form of a high voltage capacitor (not shown). The reflector housing 3 has a silvered, parabolic shaped interior to concentrate the light produced by the flash tube 5 into a beam and redirect it through the open end 11 of the housing toward a subject to be illuminated. The flash tube 5 is located at the focal point of the parabola to obtain a beam with parallel rays that exit the open end 11 of the reflector housing 3. Alternatively, the shape of the reflector housing 3 may be different or the flash tube 5 may be located in front of or behind the focal point of the parabola to obtain a beam with converging or diverging rays that exit the open end of the housing.

A front wall portion 27 of a flash enclosure (not shown) has a window defined by a nest 29 in which the flash lens 7 is seated to cover the open front 11 of the reflector housing 3. See FIG. 2. The flash lens 7 acts as a shield to protect the flash tube 5 and the silvered interior of the reflector housing 3.

The elastomeric strap 9 has a pair of opposite end portions 31 and 33, an intermediate portion 35, and respective openings 37 and 39 located between the end portions and the intermediate portion of the strap. The openings 37 and 39 in the elastomeric strap 9 receive the end portions 19 and 21 of the flash tube 5 to allow the strap to secure the flash tube and the reflector housing 3 relative to one another as shown in FIG. 2. Four pins 41, 43, 45, and 47 fixed in relation to the front wall portion 27 extend through respective openings 49, 51, 53, and 55 in the opposite end portions 31 and 33 of the elastomeric strap 9 to engage the strap at its end portions in order to induce the strap to yieldably bias the reflector housing 3 firmly against the flash lens 7. See FIG. 2. Because the four pins 41, 42, 45, and 47 and the front wall portion 27 are fixed relative to one another, the elastomeric strap 9 is stretched taunt about the closed rear 13 of the reflector housing 3 to force the housing towards the flash lens 7.

The invention has been described with reference to a preferred embodiment. However, it will be appreciated that variations and modifications can be effected within the ordinary skill in the art without departing from the scope of the invention.

I claim:

1. An electronic flash assembly comprising (a) a concave shaped reflector housing having an open front, a closed rear, and a pair of opposite side openings, (b) a flash lens covering the open front of said reflector housing, (c) a flash tube positioned in said reflector housing with respective end portions protruding outward from said side openings of the reflector housing to loosely support said flash tube, and (d) an elastomeric strap having a pair of opposite end portions, an intermediate portion extending over the exterior of said reflector housing at its closed rear, and respective openings located between the end portions and intermediate portion of said strap which receive the end portions of said flash tube to allow the strap to secure the tube and the housing relative to one another, is characterized in that:

fixed means holds said flash lens and engages said elastomeric strap at its end portions for inducing the strap to yieldably bias said reflector housing firmly against the lens.

2. An electronic flash assembly as recited in claim 1, wherein the end portions of said elastomeric strap have respective engagement openings, and said fixed means includes respective pin-like means which extend at least into the engagement openings of said elastomeric strap to engage the strap.

3. An electronic flash assembly as recited in claim 1 or 2, wherein said fixed means includes a front wall portion having window-like nest means for supporting said flash lens as said reflector housing is yieldably biased firmly against the lens.

* * * * *